United States Patent
Fujisato

(10) Patent No.: US 7,759,813 B2
(45) Date of Patent: Jul. 20, 2010

(54) GRAVITY WAVE POWER GENERATION APPARATUS

(75) Inventor: Tetsuhiko Fujisato, 2-48 Nohara 2-chome, Ube-shi, Yamaguchi (JP) 755-0024

(73) Assignees: Tetsuhiko Fujisato, Yamaguchi (JP); Shunsuke Miyao, Tokyo (JP)

( * ) Notice: Subject to any disclaimer, the term of this patent is extended or adjusted under 35 U.S.C. 154(b) by 363 days.

(21) Appl. No.: 11/895,108

(22) Filed: Aug. 23, 2007

(65) Prior Publication Data

US 2009/0051168 A1 Feb. 26, 2009

(51) Int. Cl.
*H02P 13/00* (2006.01)
*F03G 3/06* (2006.01)

(52) U.S. Cl. .......................... 290/53; 60/398
(58) Field of Classification Search ............. 290/42, 290/43, 53, 54; 60/398, 500
See application file for complete search history.

(56) References Cited

U.S. PATENT DOCUMENTS

| | | | | | |
|---|---|---|---|---|---|
| 3,965,365 | A | * | 6/1976 | Parr | 290/53 |
| 4,319,454 | A | * | 3/1982 | Lucia | 60/506 |
| 4,371,788 | A | * | 2/1983 | Smith, Jr. | 290/42 |
| 4,389,843 | A | * | 6/1983 | Lamberti | 60/507 |
| 4,400,940 | A | * | 8/1983 | Watabe et al. | 60/502 |
| 4,408,455 | A | * | 10/1983 | Montgomery | 60/505 |
| 4,480,966 | A | * | 11/1984 | Smith | 417/332 |
| 4,580,400 | A | * | 4/1986 | Watabe et al. | 60/398 |
| 6,269,636 | B1 | * | 8/2001 | Hatzilakos | 60/398 |
| 7,023,104 | B2 | * | 4/2006 | Kobashikawa et al. | 290/42 |
| 7,075,189 | B2 | * | 7/2006 | Heronemus et al. | 290/44 |
| 7,315,092 | B2 | * | 1/2008 | Cook | 290/53 |
| 7,456,512 | B2 | * | 11/2008 | Nadel | 290/53 |

FOREIGN PATENT DOCUMENTS

| JP | 2004-68638 | 3/2004 |
|---|---|---|
| JP | 2004-211607 | 7/2004 |

* cited by examiner

*Primary Examiner*—Nicholas Ponomarenko
(74) *Attorney, Agent, or Firm*—Muramatsu & Associates

(57) ABSTRACT

A power generation apparatus that will not exhaust carbon dioxide is provided where a strong rotating motion is created by the combination of solar heat energy, gravitational energy, and ocean current or tidal current energy. In the sea area having stream current such as ocean current and tidal current, the power generation apparatus is constructed by a weight mass provided with a rotation axis (shaft) on the top part thereof, a floating body provided with a bearing for fitting in the rotation axis where it moves up and down according to the swell on the ocean surface, a normal rotation conversion generator for converting the reverse motion produced on the rotation axis to a normal rotating motion by using a one-way clutch or a ratchet mechanism, and a mooring member for fastening the wire rope between the anchor and the connecting point of the floating body and weight mass.

4 Claims, 4 Drawing Sheets

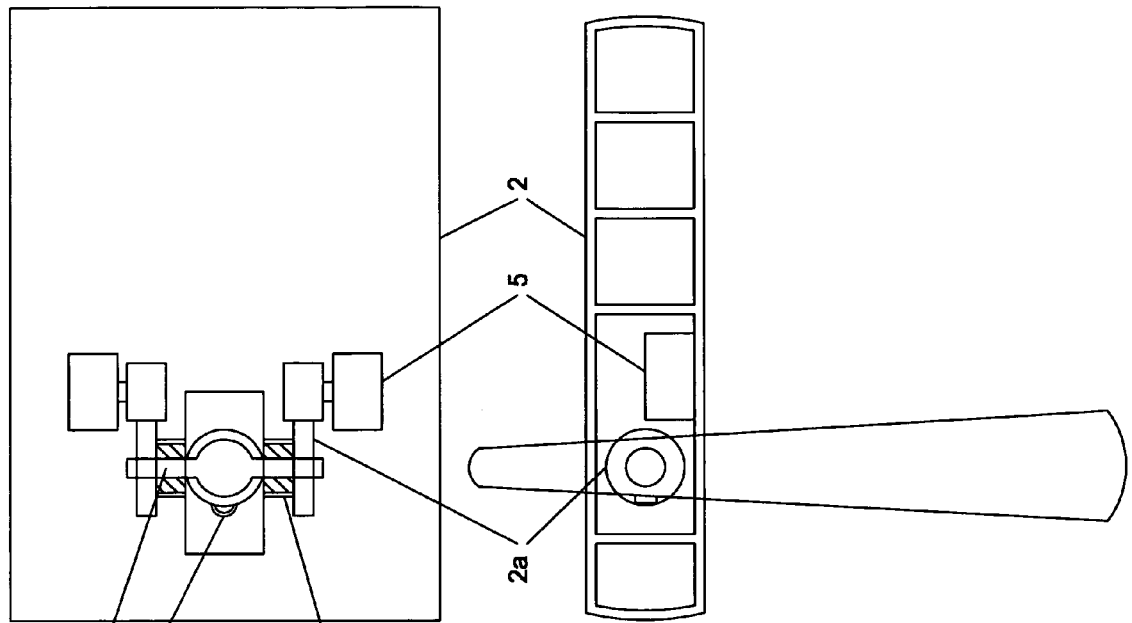
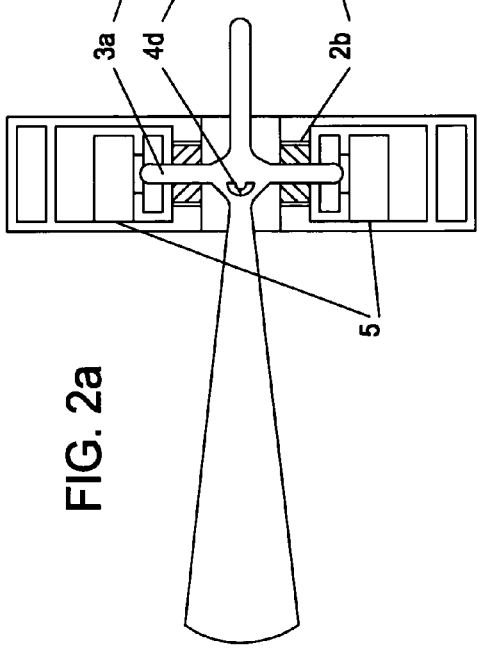
FIG. 2a
FIG. 2b
FIG. 2c

GRAVITY WAVE POWER GENERATION APPARATUS

FIELD OF THE INVENTION

The present invention relates to a gravity wave power generation apparatus incorporated in the sea area having stream current such as ocean current and tidal current that is capable of producing natural energy made up of wave power energy, gravitational energy, and current energy by establishing a bearing on the buoyant body that is catching the waves (swell) from the sea area, fitting a weight mass attached to a rotation axis (shaft) on that buoyant body, and mooring it to an anchor established at the bottom of the sea, where a reverse motion of the rotation axis is converted into a normal rotating motion by using a one-way clutch or a ratchet mechanism.

BACKGROUND OF THE INVENTION

A natural energy generation apparatus that combines waves, gravity, and current does not exist, thus, an ocean current generation and a wave power generation will be used as a reference. As for other natural energy generation apparatuses, there are ones using solar heat, wind power, hydraulic power, and geothermal power.

1. An ocean current generation apparatus for converting the ocean water current into electric power by establishing a hydraulic turbine under the buoyant body that is placed on the surface of the ocean as shown, for example, in Japanese Patent Laid-open Publication No. 2004-68638.

2. A wave power generation apparatus that generates electric power by tying a rope to the floating body that is floating on the surface of the ocean, operating the compression pump by moving the spindle up and down through the pulley, thereby rotating the turbine generator as shown, for example, in Japanese Patent Laid-Open Publication No. 2004-211607.

Other than the above wave power generation apparatus, there is another wave power generation apparatus which produces an up and down airflow from the swell of the waves and applies it to the blade of the turbine for rotation.

However, the conventional technologies disclosed by the above noted patent documents 1 and 2 have the following problems.

The flow of the ocean water is mainly comprised of ocean current and tidal current, where the speed of the tidal current is said to be two times faster than that of the ocean current. However, even if electric power is generated by using a hydraulic turbine (propeller) with this tidal current of higher speed, the generated amount of electric power is small in comparison to the equipment fee, and further, since the current direction changes four times per day, the maintenance fee becomes costly. Moreover, by floating the floating body on the surface of the waves (swell) and connecting it to a rope for suspension, the amount of wave power generation produced by the potential energy, where the floating body moves up and down by the swell, is also small in comparison to the equipment fee and is not practical. Furthermore, although the turbine power generation from the airflow is practical in a small scale generation, in order to manufacture a large scale generation apparatus, the energy from the airflow alone is not sufficient, thus, it is extremely difficult to put this technology in a practical use from the cost versus effectiveness stand point.

SUMMARY OF THE INVENTION

Therefore, it is an object of the present invention to solve the above problems. The distribution of solar heat energy, which is the largest energy covering the surface of the earth, is not uniform, and creates an imbalance even in the ocean waters that largely absorbs from the surface of the earth, thus, creating an imbalance in the ocean water temperature as well. Further, the inertial energy from the rotation of the earth is added thereon to cause an ocean current in the sea area.

In addition, winds are created by the solar heat energy that covers the surface of the earth, thus, creating waves (swell) on the ocean surface.

It is an object is to provide a gravity wave power generation apparatus that is capable of producing a high electrical power by combining the ocean current energy and wave power energy as well as the gravitational energy of the earth (With respect to the sea area involving with the tidal current, the attractive force energy of the moon will be further included).

The gravity wave power generation apparatus based on the first embodiment of the present invention is comprised of a weight mass provided with a rotation axis (shaft) on top thereof, a floating body that moves up and down in response to the swell on the surface of the ocean provided with a bearing to fit the rotation axis, a normal rotation conversion generator for converting the reverse motion created by the rotation axis fitted into the bearing of the floating body to a normal rotating motion by using a one-way clutch or a ratchet mechanism, and a mooring member for fastening the weight mass to an anchor that is established at the bottom of the ocean where a wire rope and buoy is used at the connecting point of the weight mass and the floating body.

The following actions are achieved by this structure.

(1) Since the connecting point of the floating body and the weight mass is moored to the anchor that is established at the bottom of the ocean, the waves (swell) on the top of the sea area can be captured by the entire floating body.

(2) Since the entire floating body can be moved up and down based on the rotation axis fitted into the bearing of the floating body, an extremely strong reverse motion can be produced on the rotation axis.

(3) Since the normal rotation conversion generator is incorporated therein, the reverse motion of the rotation axis can be converted into a normal rotating motion to drive the power generation apparatus.

The gravity wave power generation apparatus based on the second embodiment of the present invention is comprised of a filling and draining valve for drawing in or draining out the ocean water inside the floating body, a reel for reeling in and out the wire rope on the mooring member, and a compressor for draining out the ocean water inside the floating body using the compressed air to increase the buoyancy of the entire apparatus, in order to protect the entire apparatus from the impact of strong waves by adjusting to the weather conditions such as typhoons and precipitating the apparatus into the ocean.

In addition to the above-mentioned actions of the first embodiment, the following actions are achieved by this structure.

(1) Since the filling and draining valve and the compressor are incorporated therein, the buoyancy of the floating body can be decreased by allowing the ocean water to fill in the floating body through the filling and draining valve in accordance with the weather condition, and further, since the compressor is provided thereto, the compressed air can be stored, where the ocean water inside the floating body is drained out through the filling and draining valve to increase the buoyancy of the floating body.

(2) Since the reel is incorporated therein, the entire apparatus can be protected from the strong waves by precipitating the entire apparatus into the ocean during a typhoon.

(3) Further, even when the entire apparatus is precipitated in the ocean, it can generate electric power by producing a reverse motion on the rotation axis.

The gravity wave power generation apparatus based on the third embodiment of the present invention is comprised of a rotation blade for producing a seesaw motion (in the direction of the ocean current) on the weight mass by moving backwards upon receiving a strong ocean current resistance when the waves (swell) from the sea area are small and returning forward by the restored force from the gravity when the resistance of the ocean current is weak, and a weight mass weight adjusting chamber for changing the weight of the weight mass by establishing a chamber under the weight mass precipitated in the ocean and supplying the air or ocean water thereto in accordance with the weather condition of the sea area.

In addition to the above-mentioned actions of the first and second embodiments, the following actions are achieved by this structure.

(1) Since the rotation blade is incorporated therein, when the waves as well as the up and down motion of the floating body is small, the reverse motion of the rotation axis can be strengthened to increase the amount of generated electric power by making the seesaw motion of the weight mass larger through receiving or avoiding a strong current resistance with use of the rotation blade.

(2) Further, since the weight mass weight adjusting chamber is incorporated therein, the weight of the weight mass can be changed in accordance with the weather condition to make the seesaw motion of the weight mass larger, and the reverse motion produced on the rotation axis can be adjusted to be stronger.

The gravity wave power generation apparatus based on the fourth embodiment of the present invention is comprised of a top column provided with an axis at the very top of the weight mass above the ocean water when the waves of the sea area is small, a sail for capturing or warding off the winds above the sea area by raising or lowering the sail on the sail column attached to the top part of the axis, and a spindle attached to the bottom part of the axis that inclines in the opposite direction of the sail to make the seesaw motion of the weight mass bigger.

In addition to the above-mentioned actions of the first, second, and third embodiments, the following actions are achieved by this structure.

(1) Since the sail is incorporated therein, the energy from the wind power above the sea area can be captured to incline the spindle in the opposite direction of the wind.

(2) Since the spindle is incorporated therein, the weight of the weight mass can be changed by the inclination of the spindle, thus, allowing a bigger seesaw motion on the weight mass, which increases the amount of electric power generation.

According to the gravity wave power generation apparatus based on the first embodiment of the present invention, the following effects are achieved.

(a) Since the waves and current are always being created, the electric power can be generated 24 hours, thus, having high efficiency and stability.

(b) Since the gravity wave power generation apparatus is so constructed that the wave power energy, gravitational energy, and current energy are concentrated on the rotation axis, a strong energy from the rotation axis can be collected in a highly efficient way, thus, resulting in a high economical efficiency.

(c) The weight mass and the floating body can be manufactured with metal, however, the area other than around the rotation axis at the top of the weight mass can be made of concrete, and further, the area other than around the floating body and bearing can be made of concrete as well, which allows to build a large scale generation apparatus at low cost, thus, resulting in a high economical efficiency.

(d) As for the mooring method for the anchor at the bottom of the ocean, a wire rope is first connected to the concrete anchor manufactured on the land or above the ocean, where it can be moored by dropping it to the bottom of the ocean from above the ocean, where the establishment of the power generation apparatus at the site of the sea area can be done easily.

According to the gravity wave power generation apparatus of the second embodiment of the present invention, in addition to the effects of the above-mentioned first embodiment, the following effects are achieved.

(a) Since the entire apparatus can be precipitated into the ocean even during a stormy condition such as a typhoon, the entire apparatus can be protected from the changing weather conditions, thus, resulting in a high flexibility and controllability.

(b) Further, since the reverse motion can be produced on the rotation axis even when the entire apparatus is precipitated into the ocean, electric power can be generated, thus, resulting in a high economical efficiency.

According to the gravity wave power generation apparatus of the third embodiment of the present invention, in addition to the effects of the above-mentioned first and second embodiments, the following effects are achieved.

(a) When the waves as well as the up and down motion of the floating body are small, the current energy in the ocean can be captured efficiently to make the seesaw motion as well as the amount of generated electric power bigger, thus, resulting in a high flexibility and economical efficiency.

(b) Since the weight of the weight mass can be changed according to the weather conditions of the sea area, an efficient electric power generation can be maintained, thus, resulting in a high flexibility and operability.

According to the gravity wave power generation apparatus in the fourth embodiment of the present invention, in addition to the effects of the above-mentioned first, second, and third embodiments, the following effects are achieved.

(a) When the waves as well as the up and down motion of the sea area are small, the wind power energy and gravitational energy above the ocean can be captured efficiently to make the seesaw motion of the weight mass as well as the amount of generated electric power bigger, thus, resulting in a high flexibility and economical efficiency.

(b) Further, when the fourth embodiment is operated in combination with the third embodiment, the seesaw motion of the weight mass as well as the amount of generated electric power are further increased, thus, resulting in a high economical efficiency.

BRIEF DESCRIPTION OF THE DRAWINGS

FIGS. 2a-2c show the embodiment of the gravity wave power generation apparatus 1, where FIG. 2a is a cross sectional side view thereof, FIG. 2b is a cross sectional plan view thereof, and FIG. 2c is a cross sectional front view thereof.

REFERENCE NUMERALS

Figure 1:
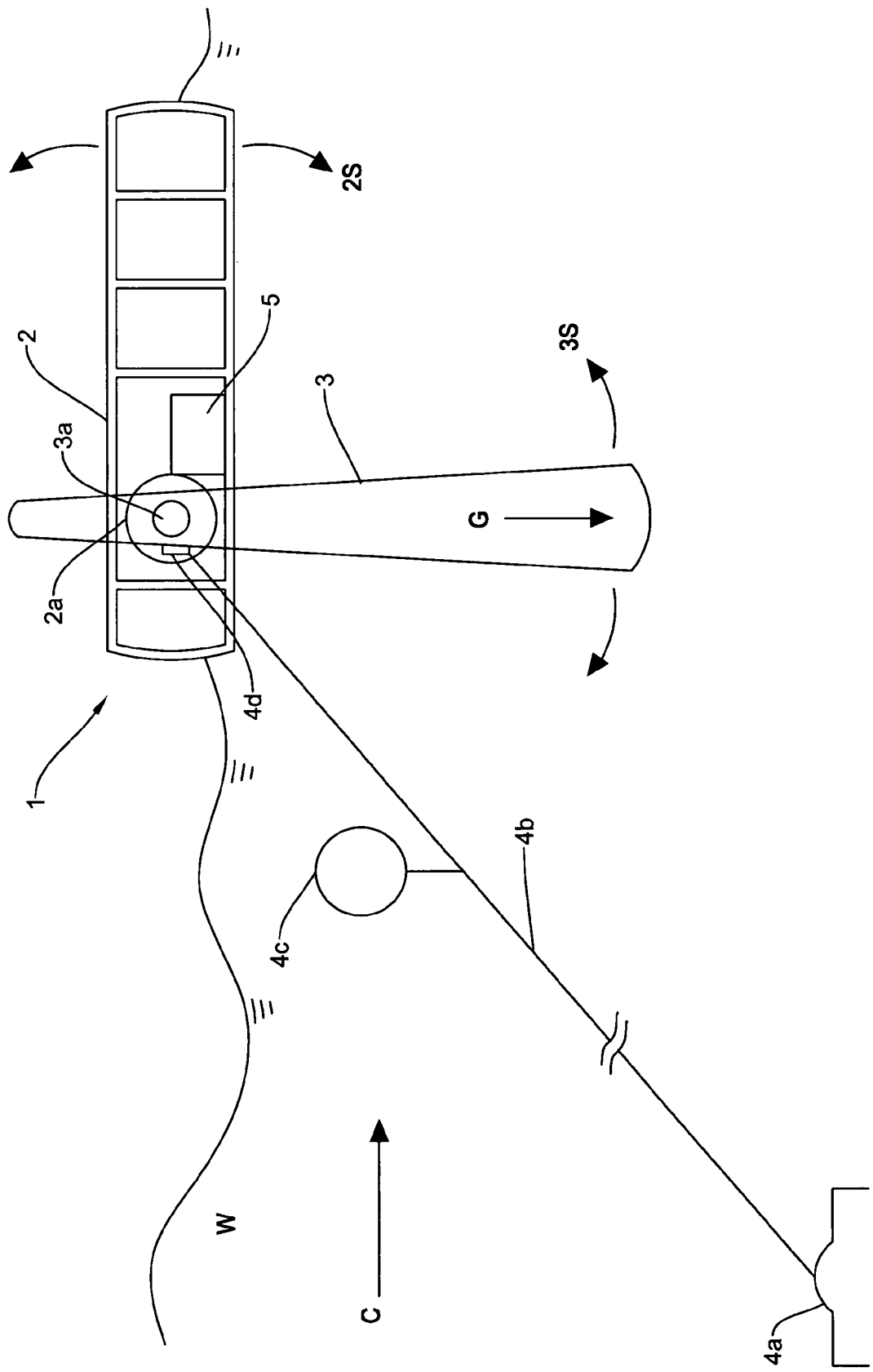
FIG. 1 is a schematic diagram showing a structure of the embodiment of the gravity wave power generation apparatus 1.

1: Gravity wave power generation apparatus
2: Floating body
2S: Up and down motion of the floating body
2a: Normal rotation converter
2b: Bearing
2c: Airflow
2d: Air turbine
2r: Wave receiving structure
3: Weight mass
3S: Seesaw motion of the weight mass
3a: Rotation axis
3b: Top column
3c: Weight mass weight adjusting chamber
3d: Axis
4S: Inclining motion of spindle P
4a: Anchor
4b: Wire rope
4c: Buoy
4d: Hook
5: Electric power generator
B: Wind
C: Stream current
D: Filling and draining valve
F: Rotation blade
G: Gravity
P: Spindle
R: Reel
W: Waves
Comp: Compressor
Sail: Sail

PREFERRED EMBODIMENT OF THE INVENTION

FIG. 1 is a schematic diagram showing a structure of the embodiment of the gravity wave power generation apparatus 1 in the present invention, where W denotes waves, C denotes stream current such as ocean current and tidal current, and G denotes gravity.

Reference numeral 1 denotes the gravity wave power generation apparatus, reference 2 denotes a floating body that is floating on the ocean surface, reference 2S denotes an up and down motion of the floating body that is moving in response to the waves, reference 2a denotes a normal rotation converter where the reverse motion of rotation axis 3a going through a bearing 2b created by the up and down motion of floating body 2 is converted into a normal rotation by a one-way clutch or a ratchet mechanism, reference 2b denotes a bearing where the left and right side thereof is stabilized and attached to floating body 2, reference 3 denotes a weight mass pulled towards the bottom of the ocean by the gravity G, reference 3a denotes a shaft-like rotation axis extended out to the left and right and joined as one unit with the top part of weight mass 3, reference 3S denotes the seesaw motion of the weight mass created by the up and down motion of ocean current C and the floating body 2 based on the rotation axis 3a and the bearing 2b, reference 4a denotes an anchor positioned at the bottom of the ocean for mooring the gravity wave power generation apparatus 1, reference 4b denotes a wire rope for connecting the gravity wave power generation apparatus 1 with the anchor 4a, reference 4c denotes a buoy for making the wire rope 4b float so that its weight will not be added to the gravity wave power generation apparatus 1, reference 4d denotes a hook established on the weight mass 3 for connecting the wire rope 4b and the weight mass 3, and reference 5 denotes an electric power generator for generating electric power by the rotation created by the normal rotation converter 2a. FIGS. 2a-2c show the structure of the gravity wave power generation apparatus 1, where FIG. 2a is a cross sectional side view thereof, FIG. 2b is a cross sectional plan view thereof, and FIG. 2c is a cross sectional front view thereof.

The operation method in the embodiment of the gravity wave power generation apparatus 1 will be explained. First, by mooring the anchor 4a positioned at the bottom of the ocean to the hook 4d using the wire rope 4b, the floating body 2 will receive waves W of the sea area, which generates up and down motions 2S. During this time, an extremely strong reverse motion can be created on the rotation axis 3a that is joined to the weight mass 3 as one unit, and by changing the reverse motion to a normal rotating motion using the normal rotation converter 2a, the generator 5 can operate to generate the electric power. Further, since the stream current only goes in one direction in the ocean current area, by making the connecting point between the weight mass 3 and the floating body 2 on the end of floating body 2, the direction of the power generation apparatus will be stabilized.

Figure 3:
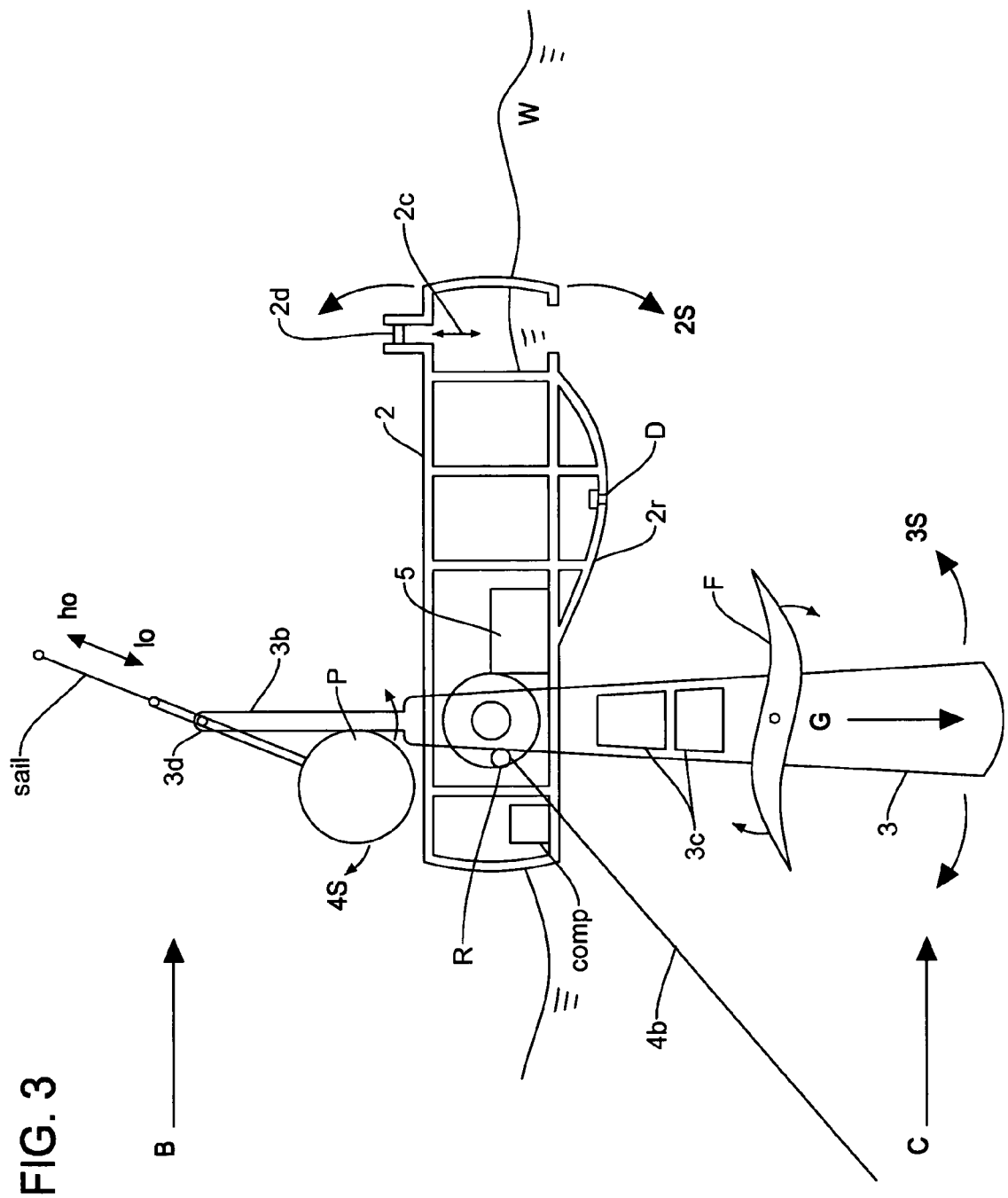
FIG. 3 is a cross sectional front view of the embodiment of the gravity wave power generation apparatus 1, where a mechanism for precipitating the apparatus into the ocean during a typhoon, etc., and a mechanism for increasing the seesaw motion 3S of the weight mass 3 in order to increase the amount of generated electric power are provided.

FIG. 3 shows the embodiment of the gravity wave power generation apparatus 1 established with a mechanism for precipitating the gravity wave power generation apparatus 1 into the ocean in accordance with the weather condition to protect the entire apparatus from the impact of waves caused by strong winds and typhoons. Further, it shows the gravity wave power generation apparatus 1 established with a mechanism for making the resistance of the current received by the weight mass 3 under the ocean stronger or weaker, and moreover, making the seesaw motion of the weight mass 3 bigger by attaching a sail on the top of axis 3d established on the upper side of the top column 3b above the ocean surface as well as a spindle pendulum P for transferring the weight of the weight mass to the bottom of axis 3d when the up and down motion 2S of the floating body 2 is small due to small waves W (swell) so that the amount of electric power generated is increased.

First, the method for precipitating the gravity wave power generation apparatus into the ocean will be explained with reference to FIG. 3.

Reference letter D denotes a filling and draining valve for allowing the ocean water to fill in or drain out of the floating body 2, and reference letter R denotes a reel for allowing the ocean water to come inside the floating body 2 through the filling and draining valve D and reeling in the wire rope 4b connected to the anchor 4a to precipitate the entire generation apparatus.

Even when this gravity wave power generation apparatus is precipitated under the ocean water, it can still generate electric power as long as the reverse motion is created on the end part of the rotation axis 3a, thus, the electric power can still be generated while adjusting the degree of precipitation according to the ocean waves when attacked by a typhoon.

In addition, when the power generation apparatus is going to be brought up to the ocean water surface, by reeling in the reel R and sending in the compressed air to the floating body 2 created by the compressor (comp) installed within the floating body 2, the ocean waters can be drained out from the filling and draining valve D, where the floating body 2 rises to the ocean water surface by the increased buoyancy.

Moreover, since a control room where a person can live in can be built within the floating body 2, the power generation apparatus can be maintained and operated at an optimum manner in accordance with the weather condition.

Next, the method for increasing the amount of generated electric power by making the seesaw motion 3S of the weight mass 3 bigger when the waves W (swell) of the sea area as well as the up and down motion of floating body 2 are small will be explained with reference to FIG. 3.

Reference letter F denotes a rotation blade placed on the left and right side of the bottom part of weight mass 3, and when it is in a horizontal direction as shown in FIG. 3, the resistance towards the current C is small, and when the right and left of the rotation blade F are rotated in a vertical direction, the resistance becomes bigger, where the seesaw motion 3S of the weight mass 3 also becomes bigger. Further, when the rotation blade F on the right and left side is rotated back to the horizontal direction, the weight mass 3 returns to the front side by the restored force energy based on the gravity G. From this effect, the seesaw motion 3S of the weight mass 3 will be increased (the right side of FIG. 3 is the back side).

Moreover, by independently adjusting the inclination of the left and right of the rotation blade F against the current C, a rudder for determining the appropriate direction for generation from the entire power generation apparatus will operate, and further, the rotation axis 3a and the bearing 2b, which is the connecting point between the floating body 2 and the weight mass 3 where the force is highly concentrated can be protected from damage by additional useless force.

In addition, the bottom of the floating body 2 in FIG. 3 can have a structure such as a wave receiver 2r for receiving as many effects of the waves W in order to make the up and down motion 2S bigger, and attach a rudder at the bottom in order to make the entire power generation apparatus face the appropriate direction.

Furthermore, the power source for operating the accessories such as the compressor or motor to rotate the rotation blade F uses the waves W as shown on the back side of FIG. 3 to create an up and down air stream 2c and establish a general purpose wave power generation apparatus for generating the electric power by rotating the air turbine 2d.

Reference numeral 3c in FIG. 3 is a weight mass weight adjusting chamber where the weight of weight mass 3 can be changed using air or ocean water in accordance with the weather conditions.

Also, an axis 3d established on the top column 3b of the weight mass 3 above the ocean surface is attached with a sail for catching winds B, where the sail is raised (ho) so that the sail column inclines upon catching the winds B, and a spindle P that is attached to the bottom of the axis 3d inclines in the opposite direction of the column inclination (4S) so that the center of gravity of the weight mass 3 shifts and the bottom of the weight mass 3 inclines toward the back side (3S). Further, by lowering (lo) the sail, the spindle P returns to its original position due to its weight, and the weight mass 3 also returns to its original position due to the gravity G.

From the above-mentioned actions, the seesaw motion is created on the weight mass 3.

Figure 4:
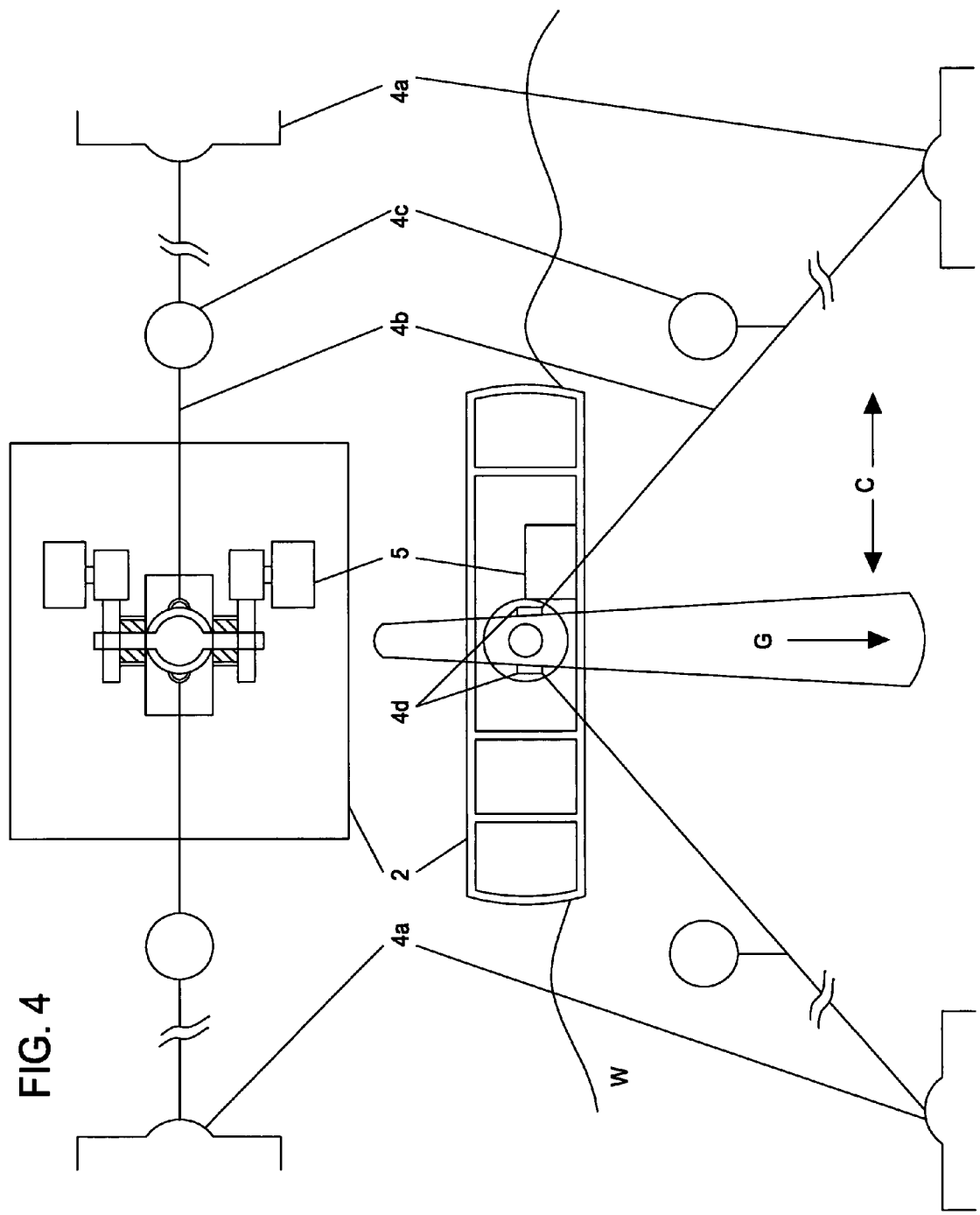
FIG. 4 shows a structure of the gravity wave power generation apparatus that is capable of generating the electric power even when the direction of the stream current changes, where its upper part is a cross sectional plan view thereof, and its lower part is a cross sectional front view thereof.

FIG. 4 show the structure of the gravity wave power generation apparatus which is capable of generating the electric power even if the stream current such as the tidal current changes direction, where its upper part is a cross sectional plan view thereof, and its lower part is a cross sectional front view thereof.

Reference numeral 2 of FIG. 4 denotes the floating body that is floating on the water surface, reference 4a denotes the anchor established at the bottom of the ocean for mooring the gravity wave power generation apparatus, reference 4b denotes the wire rope for connecting the gravity wave power generation apparatus and the anchor 4a, reference 4c denotes the buoy (multiple) for making the weight of the wire rope lighter so that its weight will not be added to the gravity wave power generation apparatus, and reference 5 denotes the electric power generator. In addition, since the current direction C moves in reverse, the hooks 4d of the weight mass 3 are established in two places, the front and back, and are moored to the front and back anchors 4a by wire ropes 4b.

Even if the front and back of the gravity wave power generation apparatus is moored and the current direction C is moving in reverse, the power generation apparatus can still generate electric power continuously since the rotation axis 3a is established at the center of the floating body 2.

Since the embodiment of the gravity wave power generation apparatus 1 is constructed as explained above, it comprises the following effects.

(a) Since it can combine the gravitational energy, wave power energy, and ocean current energy, it is possible to permanently generate a large electrical power from the natural sources.

(b) Since it can be precipitated into the ocean in accordance with the weather condition such as during a typhoon, it can protect the electric power generator from strong impacts from such typhoons.

(c) When the waves of the sea area as well as the up and down motion of the floating body 2 are small, the amount of generated electric power can be increased by making the seesaw motion 3S of the weight mass 3 bigger.

According to the present invention, the gravity wave power generation apparatus is established in the sea area having ocean current and tidal current that is close to a city, where the generated electricity supplies power to the city via submarine cables for power transmission. Further, a plant for electrolyzing water and manufacturing gaseous hydrogen is built at the same sea area to supply the gaseous hydrogen to an energy consumption area by using the electricity generated by the gravity wave power generation apparatus at the sea area.

What is claimed is:

1. A gravity wave power generation apparatus in a sea area having stream current such as ocean current and tidal current, comprising:

a weight mass provided with a rotation axis (shaft) on a top thereof;

a floating body that moves in an up and down motion according to swell on a surface of the ocean with a buoyant body provided with a bearing for fitting in the rotation axis;

a normal rotation conversion generator for converting a reverse motion occurring on said rotation axis that is fitted into the bearing of the floating body to a normal rotating motion by a one-way clutch or a ratchet mechanism;

a mooring member for fastening an anchor that is established at bottom of the ocean by using a wire rope and a buoy at a connecting point of said floating body and said weight mass;

a rotation blade capable of generating a seesaw motion (in an ocean current direction) on said weight mass by a backward motion of said weight mass by receiving a strong ocean current resistance when the waves (swell) of the sea area are small and a returning forward motion of said weight mass by a restored force based on the gravity when the ocean current resistance is weak; and a weight mass weight adjusting chamber for adjusting to the weather conditions of the sea area, establishing a chamber inside the bottom part of said weight mass in the ocean to supply air or ocean water, thereby changing the weight of said weight mass.

2. A gravity wave power generation apparatus as defined in claim 1, further comprising:

a filling and draining valve for drawing in and draining out the ocean water inside said floating body;

a reel for reeling in and out said wire rope on said mooring; and a compressor for draining out the ocean water that was stored inside said floating body by compressed air thereby increasing the buoyancy of the entire apparatus;

whereby protecting the entire apparatus from impacts caused by strong waves by adjusting to weather conditions such as typhoons and precipitating said apparatus into the ocean.

3. A gravity wave power generation apparatus as defined in claim 1, further comprising:

a top column provided with an axis at a very top of said weight mass on the surface of the ocean;

a sail for receiving or diverting winds in the sea area by raising or lowering the sail on the sail column attached to the top part of said axis; and a spindle attached to a bottom part of said axis and inclined in a direction opposite to the sail in order to make a seesaw motion of said weight mass bigger.

4. A gravity wave power generation apparatus as defined in claim 2, further comprising:

a top column provided with an axis at a very top of said weight mass on the surface of the ocean;

a sail for receiving or diverting winds in the sea area by raising or lowering the sail on the sail column attached to the top part of said axis; and a spindle attached to a bottom part of said axis and inclined in a direction opposite to the sail in order to make a seesaw motion of said weight mass bigger.

* * * * *